United States Patent [19]

Braeuninger

[11] 3,820,374
[45] June 28, 1974

[54] MANDREL FOR EXTRUDING TUBING
[75] Inventor: Karl F. Braeuninger, Ferguson, Mo.
[73] Assignee: The Dow Chemical Company, Midland, Mich.
[22] Filed: Mar. 24, 1972
[21] Appl. No.: 237,689

Related U.S. Application Data
[62] Division of Ser. No. 55,531, July 16, 1970, abandoned.

[52] U.S. Cl. ................................. 72/265, 425/381
[51] Int. Cl. ........................................... B21c 23/08
[58] Field of Search .............. 425/381, 466; 72/265

[56] References Cited
UNITED STATES PATENTS
| 2,296 | 10/1841 | Tatham et al. | 72/265 |
|---|---|---|---|
| 2,874,411 | 2/1959 | Berquist | 425/381 X |
| 3,176,494 | 4/1965 | Cullen et al. | 425/381 X |
| 3,327,350 | 6/1967 | Limbach | 425/381 |
| 3,409,941 | 11/1968 | Poux | 425/381 |
| 3,423,793 | 1/1969 | Anger | 425/381 X |
| 3,580,037 | 5/1971 | Issott | 72/265 |

FOREIGN PATENTS OR APPLICATIONS
| 560,342 | 10/1932 | Germany | 72/265 |
|---|---|---|---|
| 456,113 | 11/1936 | Great Britain | 72/265 |
| 1,012,388 | 12/1965 | Great Britain | 72/264 |
| 18,164 | 6/1907 | Norway | 72/265 |

Primary Examiner—R. Spencer Annear
Attorney, Agent, or Firm—Stephen S. Grace; Robert W. Selby

[57] ABSTRACT

A mandrel and mandrel-dummy block assembly for extrusion of tubing is disclosed wherein the mandrel has a shaft cross sectional area so related to the working section cross sectional area that the mandrel will stay in place without attachment to the dummy block. Such mandrel reduces the problems of mandrel necking down and breakage.

22 Claims, 6 Drawing Figures

MANDREL FOR EXTRUDING TUBING

This is a division of application Ser. No. 55,531, filed July 16, 1970, now abandoned.

BACKGROUND OF THE INVENTION

Hollow tubing of metal or plastic materials is commonly made by extruding a solid billet around a short mandrel held in position in a surrounding female die member by a supporting bridge or "porthole" element which extends a short distance into the container of the extrusion press. Such structures require that the extruding material must be separated into two or more "streams" which must be joined together again in the die. Sometimes the resulting "weld" zones are undesirable.

If truly seamless tubing is desired, it is extruded from hollow billets around a mandrel passing through the entire billet and secured to the ram or a dummy block ahead of the ram. Such mandrels are commonly secured to the ram by threaded joints, bolted retainer plates, T-bolts, or a hammer head enlargement behind a flange on the ram. The latter provides a "floating" mandrel which seeks its own position centered in the female die.

It is known that mandrels thus retained on the ram frequently break because the frictional forces in the die exceed the tensile strength of the mandrel. This may happen for various reasons. For example, the billet may be pushed to an excessively small butt left inside the container, the metal temperature may be too low (requiring excessively high extrusion pressure), the mandrel temperature may be too high (lowering its tensile strength), the mandrel size must be so small that it has intrinsically low strength, or the mandrel may be subjected to bending stresses as well as tensile stresses due to improper mounting or eccentrically positioned hole in the billet. Naturally, broken mandrels are an expensive problem because of costly down time on the press, loss of metal scrapped, and the cost of new mandrels.

An object of the present invention is to provide a mandrel and mandrel-dummy block assembly which reduces or overcomes the breakage and other problems presently encountered.

THE INVENTION

The present invention relates to a mandrel having a working section and an enlarged shaft wherein the shaft average cross-sectional area ($A_1$) is about equal to $$A_2 S/P_1 + A_2$$

where $A_2$ is the average cross sectional area of the working section, $P_1$ is the maximum fluostatic pressure in the container of the extrusion machine, and S is the frictional stress on the working section during extrusion. The working section is that portion of the mandrel which is in contact with the hollow billet as it is formed into tubing through an extrusion die.

Such a mandrel can be held secure in a plain socket or hole on a ram or dummy block by the "fluid" pressure of the material being extruded acting against an enlarged shaft of the mandrel where it enters the socket, i.e. the mandrel need not be attached to the ram or dummy block. The size of the enlargement can be calculated such that product of the enlargement of the cross section of the mandrel shaft ($A_1 - A_2$) multiplied by the fluid pressure in the container (P) about equals the frictional forces ($A_2 S$) normally tending to pull the mandrel through the die but is slightly lower than the tensile strength of the mandrel. The result of this proper balance of forces is that during normal extrusion the mandrel is retained in its socket by the "back" pressure on its shaft. This also permits the mandrel to move forward a short distance and then back without necking or breakage. However, if unexpected conditions arise to increase the forces tending to pull the mandrel through the die, such forces will be resisted only until the tensile strength of the mandrel is approached. Then the unexpected forces will pull the mandrel from its socket rather than fracturing it or necking it down smaller than dimensional tolerances.

The enlargement of the mandrel shaft required for proper retaining in its socket according to my invention is usually small enough that if the mandrel is pulled from its socket completely by excessive tensile stresses it will simply pass through the die without damaging the die or causing sudden destructive extrusion pressures to be built up. If calculations show that the enlargement of cross section must exceed the size of the opening in the female die member and such a mandrel is pulled from its socket by excessive tensile stresses it will simply lodge against the inner die face to plug it off. This may cause an increase in pressure in the container but this pressure is under rather constant control and can be relieved by the press operator before it is harmful to other press equipment, the mandrel or the die.

The Applicant has furthermore found that if the socket for the mandrel shaft tapers slightly outwardly from the face bearing against the billet or slightly in back of said face to the face bearing against the ram, the mandrel can have a gyro pendulum motion, i.e. can adjust itself in any direction into the center point of metal flow. Alternatively, the shaft section can be tapered inwardly from front to back to permit such pendulum motion.

The enlargement of the mandrel shaft can be stepwise but is preferably a gradual straight or curved taper. The retaining pressure depends only upon the difference in area between the working section and its shaft. A curved taper is best because it avoids stress concentrations associated with abrupt changes in diameter.

In order to facilitate removal of the mandrel from the butt end of the billet after tubing has been extruded, the mandrel preferably has a short, raised shoulder portion of the working section next to the shaft. The shoulder cross sectional area is intermediate between the working section area and the shaft area.

Figure 1:
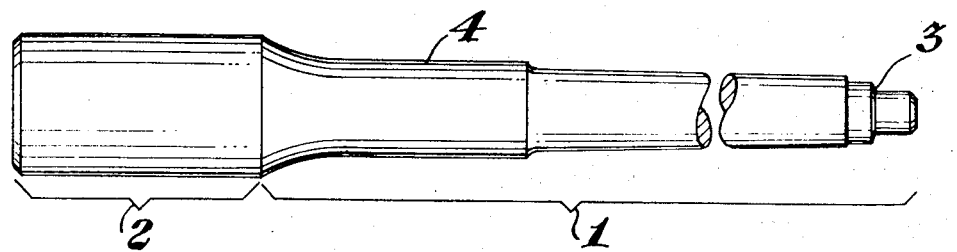
FIG. 1 is a drawing of one embodiment of the mandrel of the present invention.

Referring to FIG. 1, the mandrel comprises a working section, denoted generally as 1, and a shaft, 2. The working section has a nose portion 3 and raised shoulder 4. The working section is normally tapered outward slightly from nose to tail. An actual mandrel of this design made for extruding magnesium alloy tubing had the following dimensions: 0.785 inch diameter at the nose of the working section, 0.793 inch diameter at just below the shoulder section, 0.805 inch shoulder diameter, 1.250 inch shaft diameter, 3 inch long shaft, 12½ inch long working section.

Figure 2:
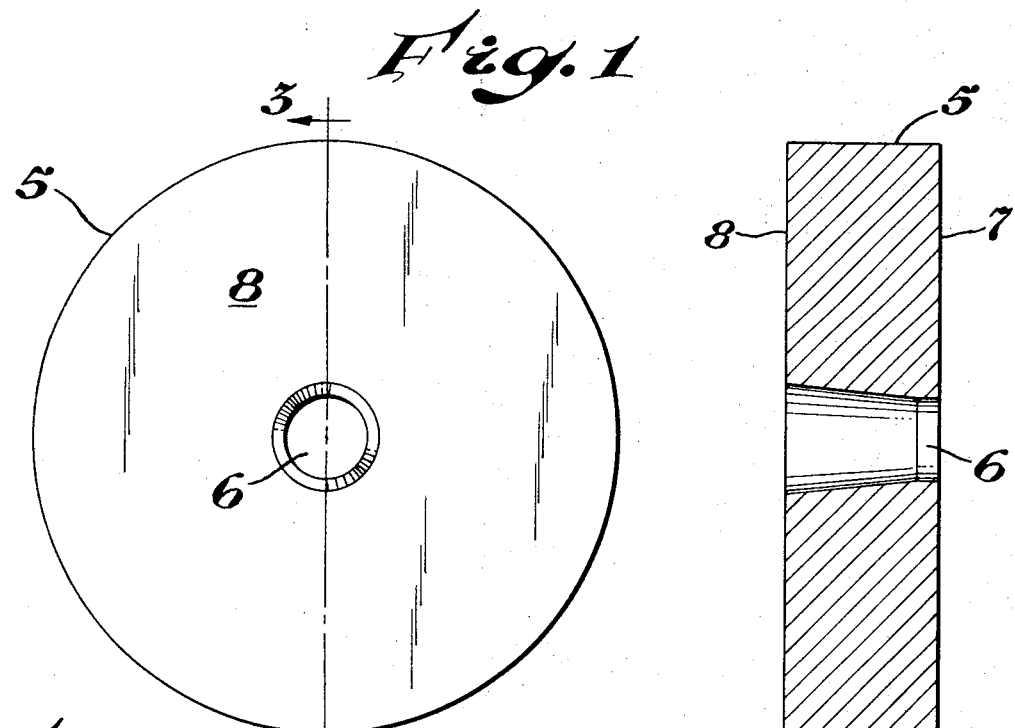
FIG. 2 is a drawing of the back face of a loose dummy block which can be used in combination with the mandrel of the present invention.
Figure 3:
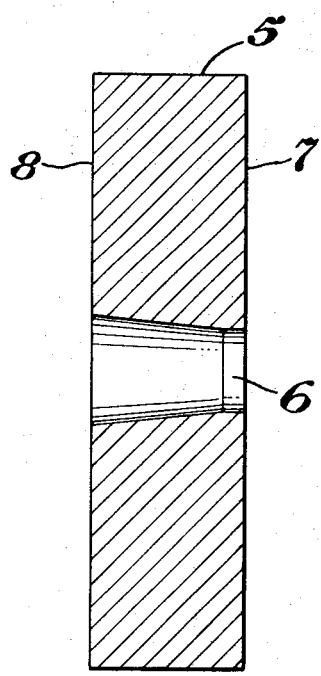
FIG. 3 is a cross section of the dummy block of FIG. 2 taken along line 3—3.

Such a mandrel can be used in an extrusion machine in combination with an attached dummy block (not shown) or loose dummy block such as shown in FIGS. 2-3. The dummy block 5 has a socket concentric with the center of the dummy block cross section. Such socket is tapered outwardly from slightly in back of the face bearing against the billet 7 (this gives less wear on the socket surface than if the taper were complete) to the face bearing against the ram 8. Such taper permits the end of the nose of the mandrel to move in any direction perpendicular to the direction of the extrusion (gyro-pendulum motion) and prevents flexing of the mandrel in case of off center billets or erratic metal flow through the die. This avoids the combined effect of friction and bending stresses.

Figure 4:
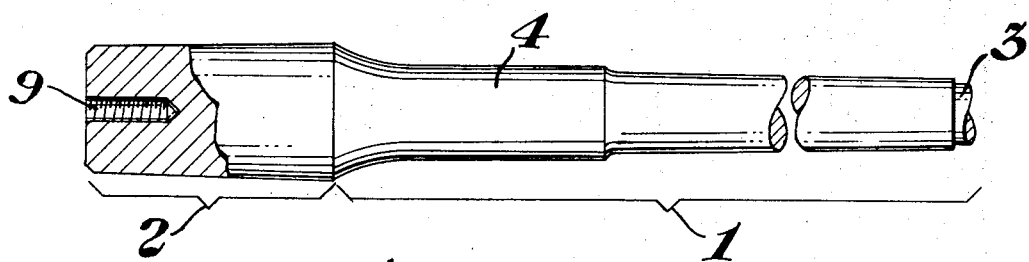
FIG. 4 is a drawing of another embodiment of the mandrel of the present invention.

Another embodiment of the mandrel of the present invention is shown in FIG. 4. In this embodiment the shaft 2 is tapered from front to rear and contains a threaded hole 9.

Figure 5:
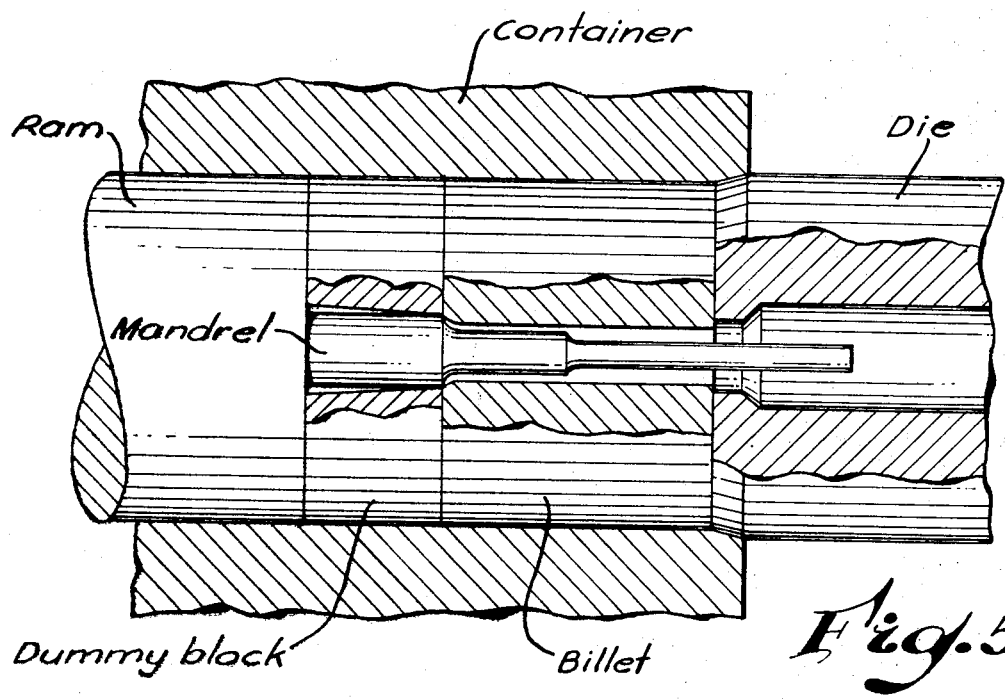
FIG. 5 is a schematic diagram of the extrusion equipment including an embodiment of the mandrel of the present invention and billet at the start of a push.
Figure 6:
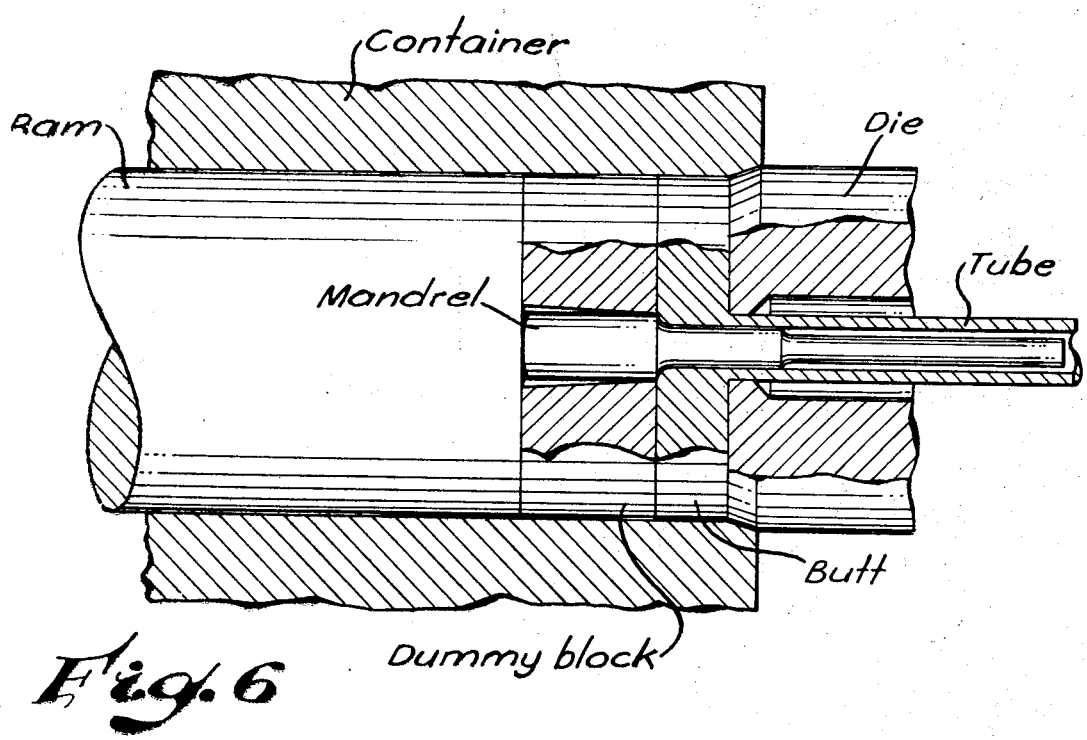
FIG. 6 is a schematic diagram of the extrusion equipment including an embodiment of the mandrel of the present invention and billet at the end of a push.

The mandrel of the present invention can be utilized in the following manner to extrude tubes of metal, plastic or similar materials. The extrusion is carried out on a conventional extrusion machine having an extrusion container, tubing die and movable ram. Where a loose dummy block is used, the hollow billet and dummy block are loaded into the extrusion container. The working section of the mandrel, normally lubricated and heated, is inserted through the socket of the dummy block into the billet. The ram is advanced and the tube extruded. The relative position of the extrusion equipment and billet at the start of the push is shown in FIG. 5. The mandrel is not attached to the ram or dummy block but merely seated in the dummy block socket. As the ram is moved forward the mandrel, having the prescribed shaft to working section area relationship, is held in position by the fluid pressure in the container acting on the shaft. FIG. 6 shows the position of the extrusion equipment and billet at the end of the push. The billet is reduced to a small butt end. The shoulder of the working section is wedged in the butt. The die and ram are pulled away. The mandrel is removed by, e.g. screwing a ring into the threaded hole 9 in the mandrel shaft (FIG. 4) and attaching a chain to the ring and the movable extrusion frame which moves the ram. The frame is then moved back pulling the mandrel out of the butt through the dummy block.

Where an attached dummy block is used, the procedure is similar. The hollow billet is loaded into the extrusion container and the nose of the mandrel inserted into the billet. The ram having the dummy block attached thereto is moved into place such that the mandrel shaft is positioned in the dummy block socket. The ram is then further advanced to extrude the tube.

The mandrel of the present invention is particularly suited for extruding small inside diameter metal tubing which cannot practically be extruded by conventional techniques due to the tendency of the mandrel to neck down and break. Especially difficult extrusions of tubes with either extremely thin or extremely heavy walls are successfully made using the present mandrel.

The basic equation for the area of the shaft which will permit the mandrel to begin to move forward out of the dummy block due to the frictional force of the material flowing forward over the mandrel is $$(A_1 - A_2)P_1 = A_2 S \tag{1}$$

where
$A_1$ = area of mandrel shaft
$A_2$ = average cross sectional area of working section of mandrel
$P_1$ = maximum fluostatic pressure in the container, dependent on the press capacity and container diameter.
$S$ = stress on the working section developed by friction.

The shaft diameter may be readily calculated from $A_1$ in equation (1). Too large a shaft diameter will restrict the mandrel movement and permit the necking typical of the conventional die mandrel process, whereas too small a shaft diameter will permit the mandrel to be sucked through the die at the end of the push. A shaft diameter slightly smaller than optimum is to be preferred to one too large, since the undamaged mandrel can be retrieved from the inside of the die if it is sucked through the die.

$$S = F/A_2 \tag{2}$$

where $F$ = force exerted on mandrel by friction. At any given instant during extrusion $$F = P_2 \pi D_1 L \mu$$

where
$P_2$ = fluostatic pressure is the container at the time in question
$D_1$ = diameter of working section of mandrel
$L$ = billet length at the time in question
$\mu$ = coefficient of friction between the extruded material and mandrel. Also at any instant during extrusion $$P_2 = P_0 e^{(4\mu L/D^2)}$$

where
$P_0$ = pressure on the die
$D_2$ = container diameter
$e$ = naperian logarithm base.

Therefore, letting $x = 4\mu L/D_2$
$$F = P_0 e^{(4\mu L/D^2)} \pi D_1 L \mu = P_0(e^x) \pi D_1 \times D_2 \mu/4\mu$$
$$= P_0 \pi D_1 D_2 (e^x) x/4$$

In order to determine F throughout the push, it is necessary to set up the following differential equation.

$$dF = (P_0 \pi D_1 D_2/4)(e^x + xe^x)dx$$

Solving the differential equation between limits $$F = \int_{x_1}^{x_2} \frac{P_0 \pi D_1 D_2}{4}(e^x + xe^x)dx$$

where $x_1 = 4\mu L_1/D_2$, $L_1$ being the length of the billet at the end of the path (butt).

$x_2 = 4\mu L_2/D_2$, $L_2$ being the length of the billet at the start of the push.

Integrating and rearranging terms, $$F = P_0 \pi D_1 \mu [L a e^{(4\mu L_2/D_2)} - L_1 e^{(4\mu L_1/D_2)}] \quad (3)$$

The generally accepted formula for the pressure at the die is $$P = \beta Y \log_e R \quad (4)$$

where $Y$ = tensile yield strength of the material being extruded (in the present example, alumina), at the temperature of extrusion; assumed to be 15 percent of the room temperature yield strength for these calculations.

$R$ = extrusion reduction ratio.

$\beta$ = a constant dependent on the extrusion die parameters.

$$\beta = K_2 \, 5.5 B_1 (C_1 + C_2)/B_2 C_3 \quad (5)$$

where $K_2$ = a constant established as $\cong 4$ for all light alloys.

$B_1$ = bearing length of the die for the tube being extruded. (The multiplier 5.5 takes into consideration the bearing effect of the mandrel.)

$B_2$ = bearing length for a round rod having the same cross sectional area as the tube being extruded.

$C_1$ = O.D. circumference of tube being extruded.

$C_2$ = I.D. circumference of the tube being extruded.

$C_s$ = circumference of round rod having the same cross sectional area as the tube being extruded.

In order to calculate the actual diameter of a mandrel shaft, it is necessary, of course, to utilize the above equations in reverse order. Considering the case of aluminum tubing having 3.812 O.D. × 1.547 inches I.D., where $B_1 = 0.5$ inch, $B_2 = 1.0$ inch, $C_1 = 11.98$ inches, $C_2 = 4.86$ inches and $C_s = 10.93$ inches.

$$\beta = 4 \times 5.5 \times 0.5 (11.98 + 4.86)/1.0 \times 10.93 = 16.93 \quad (5)$$

For a tube area of 9.53 sq. in. and a 16 inch diameter container area of 201 sq. in. (billet I.D. ignored), the reduction ratio would be 21.1. Assuming $Y = 0.15 \times 3500$ psi $= 525$ psi.

$$P_0 = 16.93 \times 525 \times \log_e 21.1 = 27100 \text{ psi} \quad (4)$$

For a 25 inch long billet and 4 inch butt, assuming $\mu = 0.04$ $$F = (27,100)(3.14)(1.547)(0.04)(25 e^{0.25} - 4 e^{0.04}) = 148,000 \quad (3)$$

For the working length of the mandrel $A_2 = 1.885$ sq. in., so $$S = 148,000/1.885 = 78,500 \text{ psi} \quad (2)$$

The value of 0.04 for $\mu$ assumes good lubrication. If the lubrication on the mandrel were to break down, $\mu$ could easily increase to a value of 0.10, in which case F would be 424,000 pounds and S would be 225,000 psi. However the working temperature of the mandrel could easily exceed 1000°, at which temperature the yield strength of —H11 or —H13 tool steel is only about 120,000 psi. Therefore, to avoid breaking the mandrel, a maximum value of 100,000 psi should be assumed for S. The fluostatic pressure $P_1$, in the 16 inch container on the 5500T press could reach 5500 × 2000/201 = 55,000 psi, so $$(A_1 - 1.885) 55000 = 1.885 \times 100,000 \quad (1)$$

$A_1 = 188500/55000 + 1.885 = 5.315$

Shaft diameter = $\sqrt{4 A_1/\pi} = \sqrt{6.76} = 2.60$ inch

To add further safety and insure that the mandrel would move forward rather than neck down, the shaft diameter was made 2.500 inches.

What is claimed is:

1. In an extrusion machine, a dummy block-mandrel assembly which comprises:

a. a dummy block having a socket concentric with the center of the dummy block cross section; and b. a pivotable mandrel placed in said socket, said mandrel having a working section and a shaft section wherein the shaft cross sectional area is about equal to $A_2 S/P_1 + A_2$ where $A_2$ is the average cross sectional area of the working section, $P_1$ is the maximum fluostatic pressure in the container of the extrusion machine, and S is the frictional stress on the working section during extrusion.

2. The assembly of claim 1 wherein the working section of the mandrel has adjoining the shaft section, a raised shoulder portion having a cross sectional area intermediate between that of the working section and that of the shaft section of the mandrel.

3. The assembly of claim 1 wherein the dummy block is attached to a ram adapted to move to thereby cause extrusion of a tube.

4. The assembly of claim 1 wherein the dummy block socket is at least partially tapered outwardly from front to rear.

5. The assembly of claim 1 wherein the shaft is tapered inwardly away from the working section.

6. The assembly of claim 3 wherein the dummy block socket is tapered outwardly from front to rear.

7. The assembly of claim 1 wherein said mandrel is maintained within said socket by means of a fluid pressure.

8. The assembly of claim 1 wherein the dummy block socket is threadless.

9. In an extrusion machine, a dummy block-mandrel assembly which comprises:

a. a dummy block having a socket concentric with the center of the dummy block cross section and at least partially tapered outwardly from front to rear; and b. a mandrel placed in said socket which has a working section and a shaft section wherein the shaft cross sectional area is about equal to $A_2S/P_1 + A_2$ where $A_2$ is the average cross sectional area of the working section, $P_1$ is the maximum fluostatic pressure in the container of the extrusion machine, and $S$ is the frictional stress on the working section during extrusion.

10. The assembly of claim 9 wherein the working section of the mandrel has adjoining the shaft section, a raised shoulder portion having a cross sectional area intermediate between that of the working section and that of the shaft section of the mandrel.

11. The assembly of claim 9 wherein the dummy block socket is threadless and the mandrel is maintained within the threadless socket by means of a fluid pressure.

12. The assembly of claim 11 wherein the mandrel shaft is tapered inwardly away from the working section.

13. The assembly of claim 12 wherein the working section of the mandrel has adjoining the shaft section, a raised shoulder portion having a cross sectional area intermediate between that of the working section and that of the shaft section of the mandrel.

14. The assembly of claim 13 wherein the dummy block is attached to a ram adapted to move to thereby cause extrusion of a tube.

15. In an extrusion machine, a dummy block-mandrel assembly which comprises:

a. a dummy block having a socket concentric with the center of the dummy block cross section; and b. a mandrel placed in said socket which has a working section and a shaft section, said shaft section being tapered inwardly away from the working section and having a cross sectional area about equal to $A_2S/P_1 + A_2$ where $A_2$ is the average cross sectional area of the working section, $P_1$ is the maximum fluostatic pressure in the container of the extrusion machine, and $S$ is the frictional stress on the working section during extrusion.

16. The assembly of claim 15 wherein the working section of the mandrel has adjoining the shaft section, a raised shoulder portion having a cross sectional area intermediate between that of the working section and that of the shaft section of the mandrel.

17. The assembly of claim 15 wherein the dummy block is attached to a ram adapted to move to thereby cause extrusion of a tube.

18. The assembly of claim 15 wherein the dummy block socket is threadless and the mandrel is maintained within the threadless socket by means of a fluid pressure.

19. The assembly of claim 15 wherein the dummy block socket is at least partially tapered outwardly from front to rear.

20. The assembly of claim 19 wherein the dummy block is attached to a ram adapted to move to thereby cause extrusion of a tube.

21. The assembly of claim 20 wherein the working section of the mandrel has adjoining the shaft section, a raised shoulder portion having a cross sectional area intermediate between that of the working section and that of the shaft section of the mandrel.

22. In an extrusion machine, a dummy block-mandrel assembly which comprises:

a. a dummy block having a socket concentric with the center of the dummy block cross section; and b. a mandrel placed in said socket which has a working section and a shaft section wherein the shaft cross sectional area is about equal to $A_2S/P_1 + A_2$ where $A_2$ is the average cross sectional area of the working section, $P_1$ is the maximum fluostatic pressure in the container of the extrusion machine, and $S$ is the frictional stress on the working section during extrusion.

* * * * *

PO-1050
(5/69)

UNITED STATES PATENT OFFICE
CERTIFICATE OF CORRECTION

Patent No. 3,820,374      Dated June 28, 1974

Inventor(s) Karl F. Braeuninger

It is certified that error appears in the above-identified patent and that said Letters Patent are hereby corrected as shown below:

In column 4, line 34, delete the minus sign "-" from the equation and insert therefor an equals sign --=--.

In column 5, line 2, change the word "path" to --push--;

line 7, in the equation, the italic "a" should be deleted and a subscript digit --2-- inserted therefor, the numerator of the exponential expression in the term following the minus sign within the brackets should read $--4\mu L_1--$, and the parenthesis preceding the final bracket should be a small parenthesis closing the exponential expression;

line 18, change "alumina" to --aluminum--;

line 41, change "$C_s$" to $--C_3--$;

line 48, change "$C_s$" to $--C_3--$; and line 65, after the number "148,000", insert the symbol --#--.

Signed and sealed this 5th day of November 1974.

(SEAL)
Attest:

McCOY M. GIBSON JR.
Attesting Officer

C. MARSHALL DANN
Commissioner of Patents